United States Patent [19]
Kleykamp et al.

[11] 3,779,846
[45] Dec. 18, 1973

[54] METHOD OF CONTINUOUSLY MANUFACTURING FLEXIBLE CONDUIT

[75] Inventors: Donald L. Kleykamp, West Carrollton, Ohio; Ivan Gaster; Vernon D. Browning, both of Waynesville, N.C.; Homer N. Holden, Sylva, N.C.

[73] Assignee: Dayco Corporation, Dayton, Ohio

[22] Filed: Mar. 6, 1972

[21] Appl. No.: 231,935

Related U.S. Application Data

[62] Division of Ser. No. 89,333, Nov. 13, 1970, Pat. No. 3,725,178.

[52] U.S. Cl. ............... 156/144, 72/135, 264/209, 264/267
[51] Int. Cl. ............................................. F16l 11/08
[58] Field of Search ..................... 156/143, 144; 264/209, 267; 72/135, 137, 145, 66; 425/113, 131, 133; 138/122, 127, 174

[56] References Cited
UNITED STATES PATENTS
2,963,749   12/1960   Pavlic ........................... 156/144
3,526,692   9/1970    Onaka ........................... 425/109
3,279,502   10/1966   Waddell, Jr. .................. 138/122
2,730,762   1/1956    Ballard .......................... 425/112

*Primary Examiner*—Alfred L. Leavitt
*Assistant Examiner*—Frank Frisenda
*Attorney*—Reuben Wolk

[57]   ABSTRACT

A wire is fed from a supply roll to a device which twists the wire on its longitudinal axis and continuously forms the twisted wire into a non-rotating helical coil. The coil is fed directly from the device through a plastic tube extruding head by a rotatable screw which extends within the coil, and a vacuum is created within the tube as it is extruded over the coil to shrink the tube between the turns of the coil. The coil reinforced tube may then be fed through a device which covers the tube with a continuous fabric member, and the covered tube is then fed through another extruder head which extrudes a second tube over the fabric member and shrinks the second tube onto the fabric member and the first tube. The coil feeding screw, the fabric member forming device, the extruders, and the tube feeding devices are driven at speeds correlated with the speeds of twisting and feeding the wire to provide a continuous conduit forming operation.

5 Claims, 7 Drawing Figures

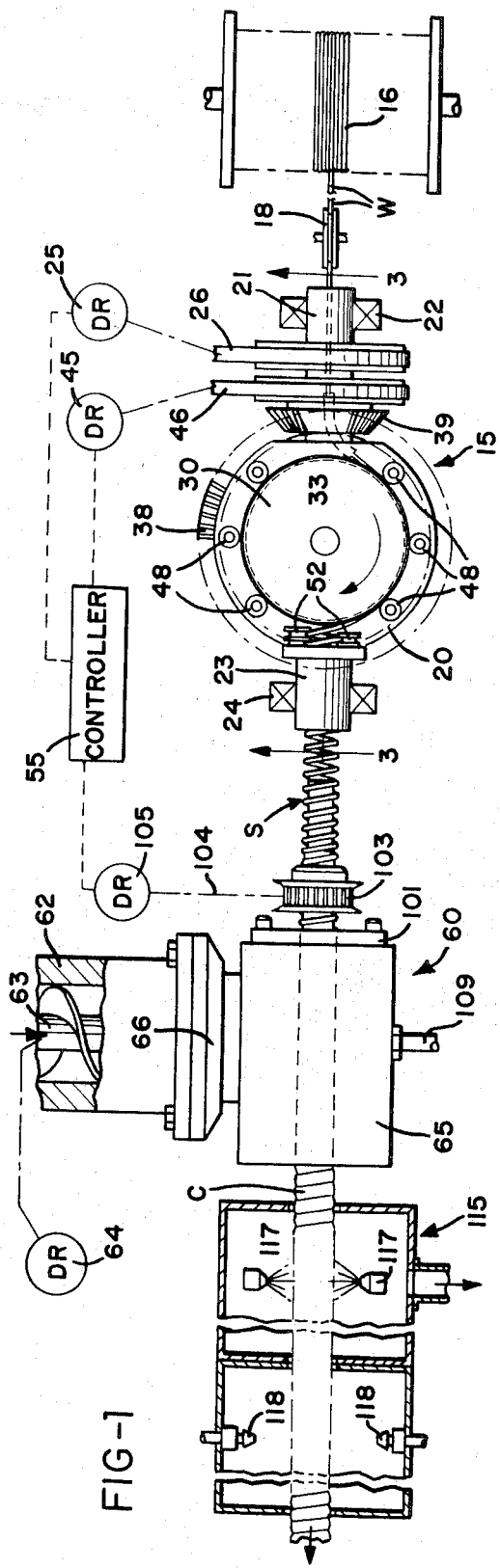
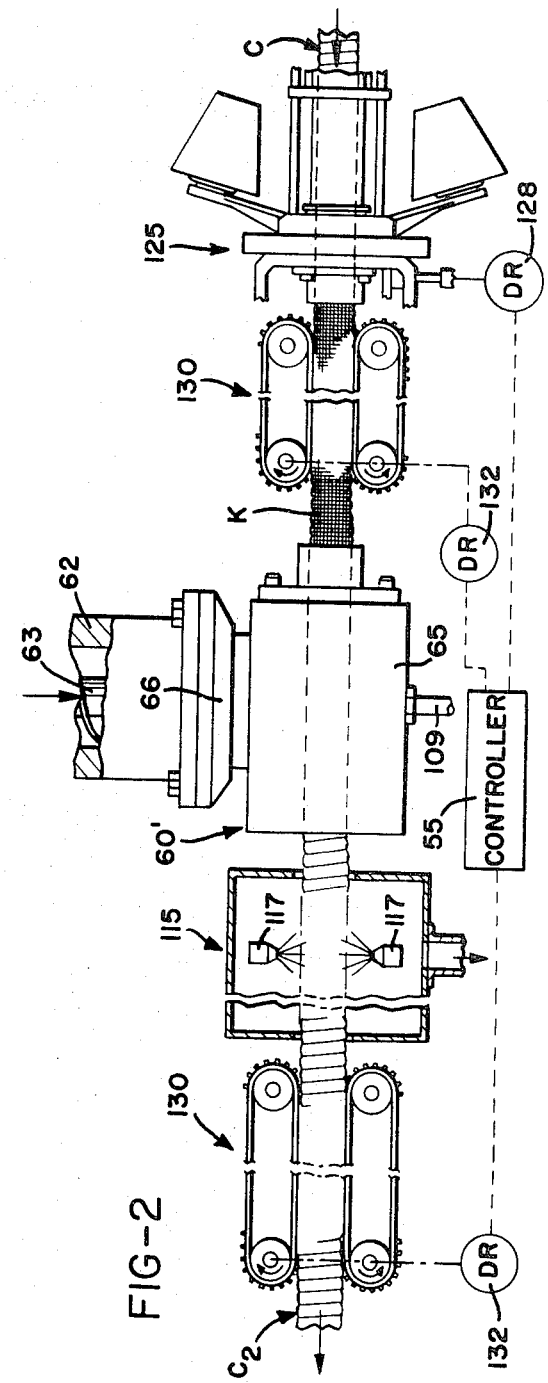
FIG-1
FIG-2

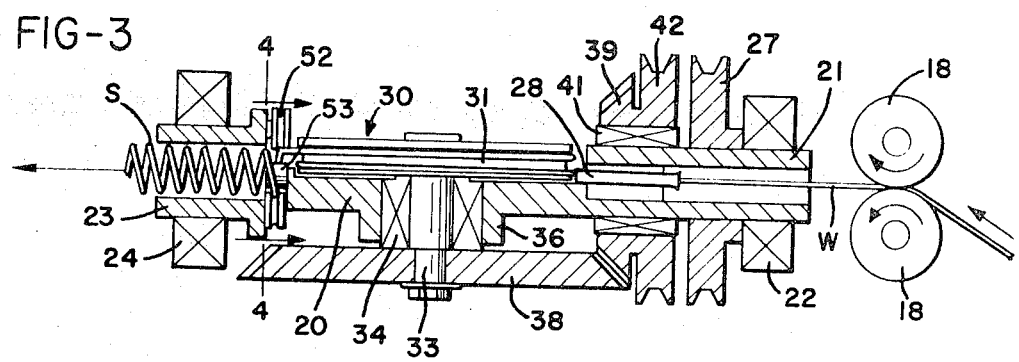
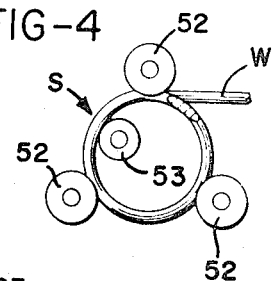
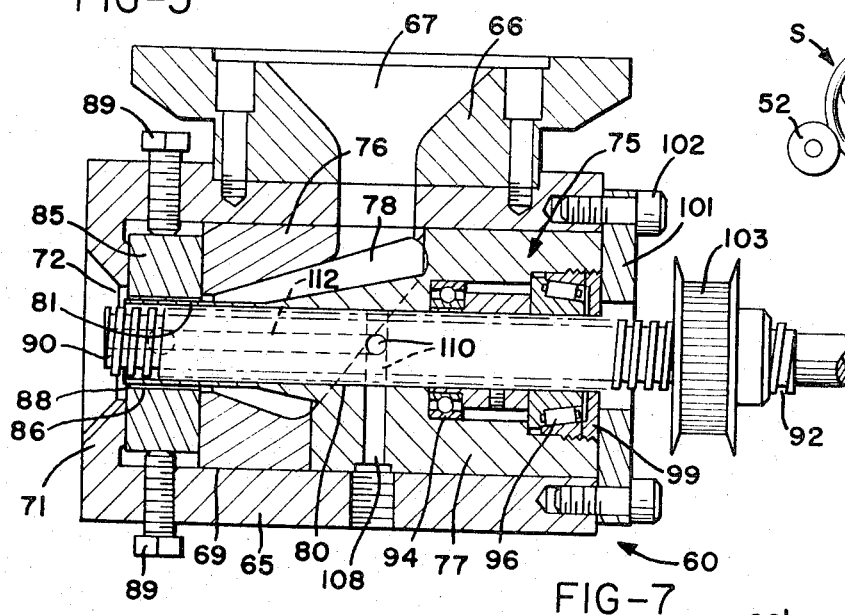
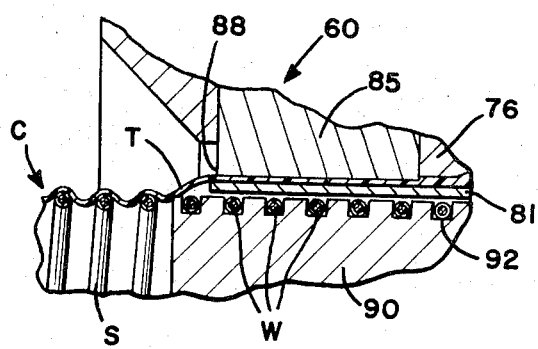
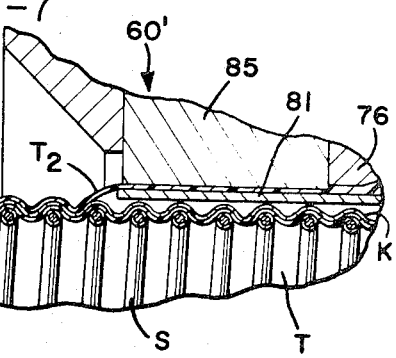

METHOD OF CONTINUOUSLY MANUFACTURING FLEXIBLE CONDUIT

This is a division, of application Ser. No. 89,333, filed Nov. 13, 1970 now U.S. Pat. No. 3,725,178.

BACKGROUND OF THE INVENTION

The present invention relates to continuously manufactured flexible conduit which is used for conveying fluids such as air, and the method and apparatus for manufacturing this conduit. More specifically, the conduit hereinafter described is the type having a helical reinforcing coil formed of axially spaced turns, about which is placed a plastic flexible tube. The purpose of this type of conduit is to provide passage of the fluid which it is conveying without substantial leakage, while at the same time being sufficiently strong to prevent collapse, light in weight for portability, and yet sufficiently flexible to permit bending.

Conventionally the helical coil is made of a plastic coated wire which is formed with axially spaced turns and the tube is bonded to the turns of the wire to form a unitary product. Occasionally such a conduit is made with a fabric reinforcement such as a braided or knitted member, which is placed over the tube; optionally, a further plastic tube is placed over this fabric member. One such conduit is disclosed in United States Pat. No. 3,279,502, of common assignment, in which a series of coils is shown as being successively fed through a plastic extruder which then covers the coils with a tube. The fabric member is placed over this tube which is then passed through another process which adds an outer member. In this patent the coils are stated as being capable of joining end to end in order to form a continuous conduit. This might be done, for example, by a welding operation as shown in United States Pat. No. 2,963,749. Such an operation, however, requires a complex mechanism and does not lend itself fully to a continuous process.

It has also been proposed to produce a reinforced conduit by wrapping a reinforcing wire on a rotating mandrel and feeding it through a plastic extruding head. United States Pat. No. 3,526,692 discloses such a device, but this requires that the plastic pipe be rotated as it is extruded, and it would thus not be suitable for continuously producing flexible reinforced corrugated conduit which must be coiled into a roll after cooling.

SUMMARY OF THE INVENTION

The present invention is directed to an improved method and apparatus for continuously producing a flexible reinforced corrugated conduit which involves the feeding of a wire (which may have a plastic coating) from a supply roll, continuously forming the wire into a non-rotating helical coil, and continuously feeding the coil through a plastic extruder head which extrudes a plastic tube onto the coil and shrinks the tube onto the coil to form helical convolutions between the turns. The invention also provides for continuously feeding the reinforced tube received from the first extruder head through a machine which places a fabric member on the tube, such as by braiding, knitting, or weaving. The fabric covered tube assembly is fed through a second extruder head which extrudes and shrinks an outer plastic tube onto the fabric covered reinforced tube assembly to form a corrugated conduit having a double plastic wall with a fabric member between.

As used throughout this application, the term "plastic" as applied to the tube or the wire coating material, is intended to include such thermoplastic materials as vinyls, polyolefins, and the like; elastomeric materials such as natural or synthetic rubber; and other materials capable of flowing in a plastic state.

In accordance with a preferred embodiment of the invention, a plastic coated wire is fed from a supply roll to a wire coil forming device which twists the wire on its longitudinal axis and then rolls or forms the twisted wire into a helical coil. The speed of twisting of the wire is correlated with the speed of feeding the wire so that the device continuously generates or produces a non-rotating helical coil of predetermined diameter. The coil is fed from the forming device onto a feed screw which extends through a plastic extruder head and is driven at a speed correlated to the speed at which the helical coil is produced.

A plastic tube is extruded onto the helical coil at the discharge end of the extruder head, and a vacuum is produced within the coil to shrink the extruded tube radially inwardly between the wire turns of the coil and to form a positive bond between the plastic tube and the plastic coating on the wire. The conduit may be cut into predetermined lengths or coiled into a roll, or the conduit may be fed directly through a braiding or knitting machine to form a fabric covering member on the reinforced plastic tube.

The fabric covered tube is fed through a second plastic extruder head which covers the fabric member with an outer plastic tube and shrinks the tube onto the fabric member and the first tube by introducing a vacuum between the first tube and the second tube as the latter is being extruded. The wire twisting and feeding means, the spring feeding screw, each of the extruders, the fabric covering machine and the two tube feeding conveyors are all driven at correlated speeds according to the desired production rate of the reinforced flexible conduit.

Additional features and advantages of the invention will be apparent from the following description, the accompanying drawings, and the appended claims.

BRIEF DESCRIPTION OF THE DRAWINGS

FIG. 1 is a general diagrammatic plan view of apparatus for continuously producing a reinforced flexible conduit in accordance with the invention.

FIG. 2 is a diagrammatic plan view of apparatus for receiving the conduit produced by the apparatus shown in FIG. 1 and continuously producing a double plastic wall flexible corrugated conduit.

FIG. 3 is a fragmentary section taken generally on the line 3—3 of FIG. 1.

FIG. 4 is a fragmentary section taken generally on the line 4—4 of FIG. 3.

FIG. 5 is an axial section of an extruder head included in the apparatus shown in FIG. 1.

FIG. 6 is an enlarged fragmentary section of the discharge end of the extruder head in FIG. 5 and showing the forming of a single plastic wall conduit.

FIG. 7 is a fragmentary section similar to FIG. 6 of the extruder head included in the apparatus in FIG. 2 and showing the forming of a double plastic wall conduit.

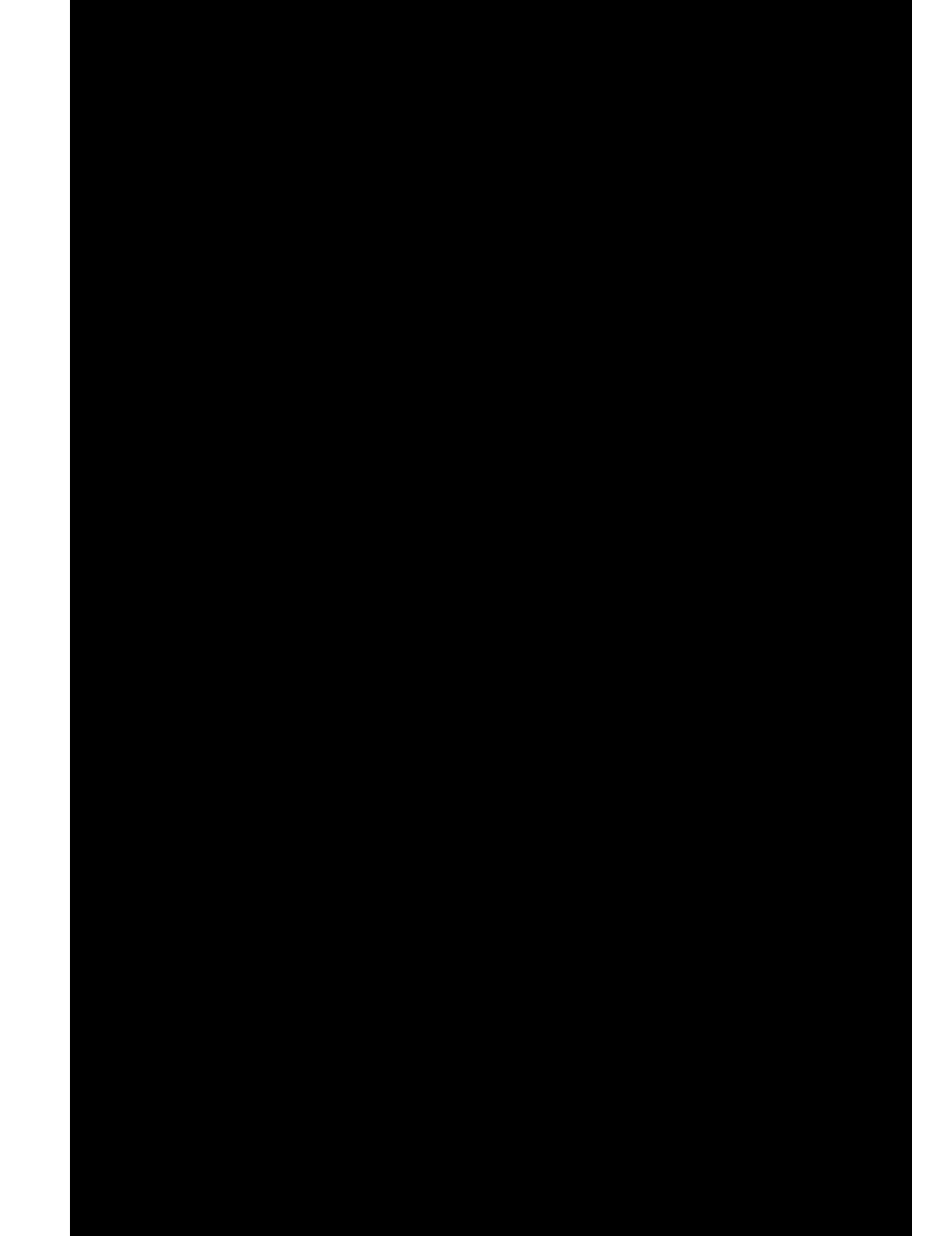

source (not shown). The passage 108 extends inwardly to the bore 80 adjacent a series of four radially extending ports 110 (FIG. 5) formed within the screw 90. A passage 112 extends axially through the screw 90 from the ports 110 to the discharge end of a screw 90 and cooperates with the ports 110 to create a vacuum adjacent the discharge end of the screw 90.

As the helical coil S is fed through the extruder head 60 by the rotating screw 90, a plastic tube T is extruded from the orifice 88 in overlying surrounding relation to the coil S. The hot plastic tube T is reduced or shrunk inwardly by the vacuum created through the passage 112 and through the clearance space between the outer surface of the screw 90 and the inner surface of the tubular sleeve portion 81 of the insert body 75. The vacuum shrinking of the tube T produces a positive bond between the tube and the plastic coated wire W and also produces helical convolutions in the tube T between the turns of the wire W as shown in FIG. 6. The motor 64 for driving the feed screw 63 of the plastic extruder, is controlled according to the axial feed rate of the helical coil S so that the plastic tube T is extruded at a rate sufficient to provide for the convolutions within the tube between the turns of the coil S.

The extruded plastic tube T and the reinforcing helical coil S form a non-rotating tubular conduit C which is directed through a cooling device 115 (FIG. 1) where the conduit passes through either a water filled trough or water sprays directed from a series of nozzles 117. After the extruded tube T is cooled, the conduit C may be dried by a blast of hot air from a plurality of nozzles 118 and then wound onto a roll, or cut into sections of predetermined length.

MODIFICATION

A further embodiment of the invention is illustrated in FIGS. 2 and 7, in which conduit C, after cooling and drying as above, may be fed directly into a braiding or knitting machine 125 which forms a tubular fabric member K tightly overlying or surrounding the plastic tube T. The member K may be formed by a knitting head, for example, as disclosed in United States Pat. No. 2,259,384, or may be formed by a braiding machine, for example, as disclosed in United States Pat. No. 3,038,523. The braiding or knitting machine 125 is driven by a variable speed motor 128 which is also operated from the main controller 55. The resulting assembly is fed through the machine 125 by a pair of opposite caterpillar-type conveyors 130 which are also driven by a variable speed motor 132 operated from the controller 55. The spacing between the conveyors 130 is precisely adjusted so that the conduit is positively gripped without significantly compressing the conduit.

The conveyors 130 also feed the conduit assembly from the machine 125 directly into another extruder head 60' which is constructed substantially identical to the extruder head 60 except that the feed screw 90 and its corresponding drive is omitted. Accordingly, the components of the extruder head 60' carry the same reference numbers as the corresponding components of the extruder head 60. As shown in FIG. 7, the extruder 60' produces an outer plastic tube $T_2$ which overlies or surrounds the conduit assembly and is in direct contact with fabric member K. The plastic tube $T_2$ is shrunk onto the assembly by the partial vacuum which is created at the discharge end of the extruder within the outer tube $T_2$ through the clearance space between the inner cylindrical surface of the tubular sleeve portion 81 of the insert member 75 and the outer surface of the fabric member K.

The shrinking of the plastic tube $T_2$ onto the conduit assembly produces a conduit $C_2$ having an inner reinforcing helical coil S surrounded by a double wall structure consisting of the inner plastic tube T and the outer plastic tube $T_2$ with the fabric member K sandwiched between the plastic tubes in a manner as shown in the above-mentioned U.S. Pat. No. 3,279,502. As further shown in FIG. 2, the double plastic wall conduit $C_2$ is fed from the extruder head 60' through another water cooling device 115 by another set of caterpillar-type conveyors 130 driven by a corresponding variable speed motor 132 operated from controller 55. In a manner as mentioned above in connection with the single plastic tubular wall conduit C, the non-rotating double plastic wall conduit $C_2$ may be coiled into a roll or cut into lengths.

From the drawings and the above description, it is apparent that the apparatus and method of the invention provide several desirable features and advantages. For example, the device 15 is effective to twist and feed the plastic coated wire W at relative correlated speeds for continuously producing a non-rotating helical coil S. Furthermore, the speed of the motor 105 is controlled in accordance with the speeds of the motors 25 and 45 to feed the continuously produced non-rotating coil directly through the extruder head 60 for continuously producing the flexible reinforced tubular conduit C.

Another important feature is provided by introducing a vacuum within the extruder head 60 and feed screw 90 through the line 109 to cause shrinking of the plastic tube T onto the coil S and between the wire convolutions immediately after the tube is extruded from the head 60 and while the tube is still hot and pliable. The screws 89 also provide the advantage of adjusting the die 85 radially to provide precise concentricity between the die bore 86 and the tubular sleeve portion 81 of the insert member 75. This not only provides for obtaining plastic tubes of precisely uniform wall thickness, but also provides for interchanging dies 85 when it is desired to change the wall thickness of the tube T.

As disclosed in connection with FIGS. 2 and 7, the present invention further provides for continuously producing a reinforced conduit $C_2$ having a multiple layer wall consisting of the inner plastic tube T, a tightly would fabric member K and the outer plastic tube $T_2$. By introducing a vacuum into the second extruder head 60' through the line 109, the outer plastic tube $T_2$ is reduced in diameter or shrunk onto the fabric member K and inner plastic tube T to form the helical convolutions within the outer plastic tube $T_2$ between the turns of the coil S and to form a permanent bond between the plastic tubes and the fabric member.

It is also within the scope of the invention to modify the forming device 15 and the feed screw 90 of the extruder head 60 for continuously producing a flexible reinforced conduit wherin the reinforcing coil is constructed of two or more insulated electrical wires. Such a conduit is commonly used with a canister type vacuum sweeper for transmitting electrical power from the main unit to a portable suction head incorporating a motor driven beater. That is, the forming device 15 may be easily modified to receive two or three coated or insulated wires W to form the wires into a double or triple helical coil. A modified feed screw 90 having corresponding double or triple helical grooves would then be used for feeding the multiple turns through the extruder head 60. It should also be understood that a flexible reinforced conduit constructed in accordance with the invention, may be provided with longitudinally extending reinforcing wires or cords such as disclosed in United States Pat. No. 3,058,493. These wires would be fed directly into the extruder head 60 or 60' and be located between the coil S and the plastic tube T or between the tube T and the fabric member K.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

We claim:

1. A method of continuously producing a flexible reinforced tubular conduit, comprising the steps of forming a supply of wire into a continuous non-rotating helical coil, axially feeding said coil in a non-rotating manner into a plastic extruder head at a speed correlated with the speed of forming said coil, extruding a plastic tube around said coil, and shrinking said tube over said coil.

2. A method as defined in claim 1 wherein said shrinking step includes the creation of a vacuum within said coil and said tube as said tube is extruded from said head.

3. A method as defined in claim 1 and further including the steps of forming a continuous fabric member around said assembled coil and tube, feeding the fabric covered coil and tube assembly through a second plastic extruder head at the same correlated speed at which the coil is fed through the first extruder head, extruding a second plastic tube around said fabric member, and shrinking said second plastic tube onto the fabric covered assembly.

4. A method for continuously producing a reinforced tubular conduit, comprising the steps of feeding a wire axially at a predetermined speed, twisting the wire on its longitudinal axis as the wire is being fed, forming the twisted wire into a helical coil of predetermined diameter, correlating the speed of twisting the wire with the speed of feeding the wire to produce a continuous non-rotating coil, feeding the non-rotating coil through a plastic extruder head at a speed correlated with the feeding and twisting speeds of the wire, and extruding a plastic tube around the coil.

5. The method of claim 1 including the steps of establishing the turns of said coil at a predetermined spacing, and maintaining said spacing while feeding said coil and extruding and shrinking said tube thereover.

* * * * *